United States Patent Office 3,734,907
Patented May 22, 1973

---

3,734,907
7 - [D-(α-AMINO-α-PHENYLACETAMIDO)] - 3 -(5-METHYL - 1,3,4 - OXADIAZOL - 2 -YLTHIO-METHYL) - 3-CEPHEM-4-CARBOXYLIC ACID AND SALTS THEREOF
Leonard Bruce Crast, Jr., Clay, N.Y., assignor to Bristol-Myers Company, New York, N.Y.
No Drawing. Filed Sept. 14, 1970, Ser. No. 72,173
Int. Cl. C07d *99/24*
U.S. Cl. 260—243 C         7 Claims

ABSTRACT OF THE DISCLOSURE

7 - [D - (α - amino-α-phenylacetamido)]-3-(5-methyl-1,3,4-oxadiazol-2-ylthiomethyl)-3-cephem - 4 - carboxylic acid and its nontoxic, pharmaceutically acceptable salts are valuable as antibacterial agents, as nutritional supplements in animal feeds and as therapeutic agents in poultry and animals, including man, and are especially useful in the treatment, particularly by oral administration, of infectious diseases caused by many Gram-positive and Gram-negative bacteria.

BACKGROUND OF THE INVENTION

(1) Field of the invention

The cephalosporins of the present invention possess the usual attributes of such compounds and are particularly useful in the treatment of bacterial infections by oral administration.

(2) Description of the prior art

Cephalothin and cephaloridine are well-known antibacterial agents; see U.S. Pats. 3,218,318; 3,449,338 and 3,498,979. The literature also contains considerable data on the activity of cephaloglycin and cephalexin; see U.S. Pats. 3,303,193 and 3,507,861 and Great Britain 985,747 and 1,054,806. Newer cephalosporins include cefazolin and cephapirin; see U.S. Pat. 3,516,997 [and also Netherlands 68/05,179 (Farmdoc 34,328) and South Africa 68/4,513] and U.S. Pat. 3,422,100.

The literature on cephalosporins has been reviewed by E. P. Abraham, Quart. Rev. (London) 21, 231 (1967), by E. Van Heyningen, Advan. Drug Res., 4, 1–70, (1967) and briefly in Annual Reports in Medicinal Chemistry, Academic Press, Inc., 111 Fifth Ave., New York, N.Y., 10003, by L. C. Cheney on pages 96 and 97 (1967) and by K. Gerzon and R. B. Morin on pp. 90–93 (1968). New cephalosporins are frequently reported at the annual Interscience Conference on Antimicrobial Agents and Chemotherapy as illustrated by Sassiver et al., Antimicrobial Agents and Chemotherapy—1968, American Society for Microbiology, Bethesda, Maryland, pages 101–114 (1969) and by Nishida et al., ibid., 236–243 (1970).

The preparation of various 7-[α-amino-arylacetamido]-cephalosporanic acids and the corresponding desacetoxy compounds in which aryl represents unsubstituted or substituted phenyl or 2- or 3-thienyl is described, for example, in British specifications 985,747, 1,017,624, 1,054,806 and 1,123,333, in Belgian Pat. 696,026 (Farmdoc No. 29,494), in U.S. Pats. 3,311,621, 3,352,858, 3,489,750, 3,489,751, 3,489,752 and 3,518,260, in Japanese Pat. 16,871/66 (Farmdoc 23,231), by Spencer et al., J. Med. Chem., 9 (5), 746–750 (1966) and by Kurita et al., J. Antibiotics (Tokyo) (A) 19, 243–249 (1966) and see also U.S. Pat. 3,485,819.

Netherlands Pats. 68/11,676 (Farmdoc 36,349) and 68/12,382 (Farmdoc 36,496) and U.S. Pats. 3,489,750 and 3,489,751 disclose ring-substituted cephaloglycins.

Various 7-[α-amino-arylacetamido]cephalosporins in which one hydrogen of the α-amino group is replaced by a carbonyl group which is attached in turn to another moiety have been reported. The earliest were the cephaloglycin and cephalexin precursors in which use was made of a common peptide blocking group such as carbobenzyloxy as illustrated by U.S. Pat. 3,364,212, Belgian Pat. 675,298 (Farmdoc 22,206), South African Pat. 67/1,260 (Farmdoc 28,654) and Belgian Pat. 696,026 (Farmdoc 29,494). Related compounds include those of U.S. Pats. 3,303,193 and 3,311,621 and 3,518,260.

Various cephalosporins, including cephalosporin C on occasion but not cephaloglycin, have been reacted with nucleophilic, aromatic mercaptans to produce compounds having the structure

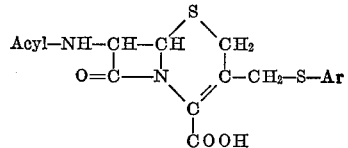

In U.S. Pat. 3,278,531 Ar is phenyl or certain substituted phenyls or certain aromatic heterocyclic rings named, for example, in column 5. Similar nucleophiles, e.g. 2-mercaptopyrimidines, are disclosed in U.S. 3,261,-832 and Great Britain 1,101,422 and U.S. 3,479,350 and U.S. 3,502,665, all issued to Glaxo. A parallel disclosure is found in Great Britain 1,109,525 to Ciba, e.g. in definition "h" for R₃. Additional nucleophiles of this type were disclosed by Fujisawa in Belgium 714,518 (Farmdoc 35,307; Netherlands 68/06,129 and South Africa 2,695/68), in Canada 818,501 (Farmdoc 38,845), in Great Britain 1,187,323 (Farmdoc 31,936; Netherlands 67/14,888) and especially in U.S. 3,516,997 (Farmdoc 34,328; Netherlands 68/05,179) which includes the compound named cefazolin, which has a tetrazolylacetyl sidechain on the 7-amino group and a 5-methyl-thiadiazolylthiomethyl group at the 3-position and is described at some length in the scientific literature, e.g. in Antimicrobial Agents and Chemotherapy—1969, American Society for Microbiology, Bethesda, Maryland at pages 236–243 and in J. Antibiotics (Japan) 23(3), 131–148 (1970). More recently, replacement of the 3-acetoxy group of a cephalosporin by various heterocyclic thiols has been disclosed in U.S. 3,563,983 and in Netherlands 70/05,519 (Farmdoc 80,188R) where the sidechains were, for example, 7-α-aminophenylacetamido and typical heterocyclic thiols were 2-methyl-1,3,4-thiadiazole-5-thiol and 1-methyl-1,2,3,4-tetrazole-5-thiol; the latter corresponds to U.S. Pat. 3,641,021, issued Feb. 8, 1972, on an application filed Apr. 18, 1969.

Various cephalosporins having the structure

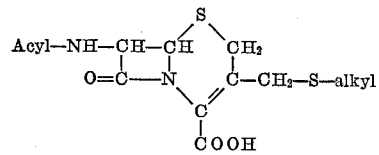

in which acyl represents various sidechains including α-aminophenylacetyl have been described in some of the above and by Glaxo in Belgium 734,532 (Farmdoc 41,-619) and in Belgium 734,533 (Farmdoc 41,620).

Cephalosporins having the structure

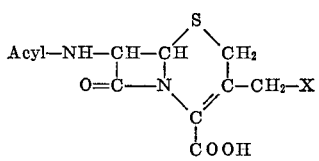

where X includes

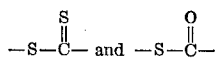

are disclosed in some of the above and in U.S. 3,239,515, 3,239,516, 3,243,435, 3,258,461, 3,431,259 and 3,446,803.

Related publications in the scientific literature include J. Med. Chem. 8, 174–181 (1965) and J. Chem. Soc. (London) 1595–1605 (1965), 5015–5031 (1965) and 1959–1963 (1967).

SUMMARY OF THE INVENTION

This invention comprises the amphoteric compound of the formula

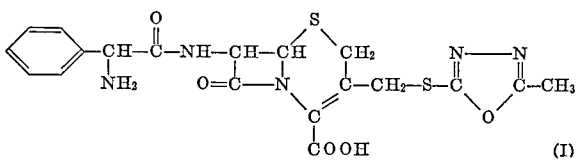

having the D configuration and existing primarily as the zwitterion, and its nontoxic pharmaceutically acceptable salts.

Such salts include the nontoxic carboxylic acid salts thereof, including nontoxic metallic salts such as sodium, potassium, calcium and aluminum, the ammonium salt and substituted ammonium salts, e.g. salts of such nontoxic amines as trialkylamines, including triethylamine, procaine, dibenzylamine, N-benyl-beta-phenethylamine, 1-ephenamine, N,N'-dibenzylethylenediamine, dehydroabietylamine, N,N'-bis - dehydroabietylethylenediamine, N-(lower)alkylpiperidine, e.g., N - ethylpiperidine, and other amines which have been used to form salts with benzylpenicillin; and the nontoxic acid addition salts thereof (i.e., the amine salts) including the mineral acid addition salts such as the hydrochloride, hydrobromide, hydroiodide, sulfate, sulfamate and phosphate and the organic acid addition salts such as the maleate, acetate, citrate, oxalate, succinate, benzoate, tartrate, fumarate, malate, mandelate, ascorbate and the like.

The amphoteric compound of the present invention is prepared according to the present invention by coupling with 7-amino-3-(5-methyl-1,3,4 - oxadiazol - 2 - ylthiomethyl)-3-cephem - 4 - carboxylic acid (II) (or a salt or easily hydrolyzed ester thereof including those of U.S. Pat. 3,284,451 and any of the silyl esters described in U.S. Pat. 3,249,622 for use with 7-aminopenicillanic acid and used in Great Britain 1,073,530) a particular acid or its functional equivalent as an acylating agent for a primary amino group. After coupling, the blocking group is removed to give the desired product. Said acid has the formula

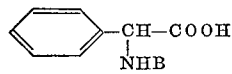

wherein B represents a blocking group of the type used either in peptide syntheses or in any of the numerous synthesis of α-aminobenzylpenicillin from 2-phenylglycine. Particularly valuable blocking groups are a proton, as in the compound of the formula

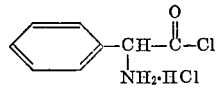

or a β-diketone as in Great Britain 1,123,333, e.g., methyl acetoacetate, in which case the acid containing the blocked amino group is preferably converted to a mixed anhydride, as with ethyl chloroformate, before reaction with compound II or a salt thereof to form the desired product I after acid cleavage.

Further to the discussion above of blocking groups used on the free amino group of the sidechain acid during its coupling with compound II, the blocking group is then removed to form the products of the present invention, e.g., the t-butoxy-carbonyl group is removed by treatment with formic acid, the carbobenzyloxy group is removed by catalytic hydrogenation, the 2-hydroxy-1-naphthcarbonyl group is removed by acid hydrolysis and the trichloroethoxycarbonyl group by treatment with zinc dust in glacial acetic acid. Obviously other functionally equivalent blocking groups for an amino group can be used and such groups are considered within the scope of this invention.

Thus, with respect to said acid to be used to couple with compound II, functional equivalents include the corresponding acid anhydrides, including mixed anhydrides and particularly the mixed anhydrides prepared from stronger acids such as the lower aliphatic monoesters of carbonic acid, or alkyl and aryl sulfonic acids and of more hindered acids such as diphenylacetic acid. In addition, an acid azide or an active ester or thioester (e.g., with p-nitrophenol, 2,4-dinitrophenol, thiophenol, thioacetic acid) may be used or the free acid itself may be coupled with compound II after first reacting said free acid with N,N'-dimethylchloroformiminium chloride [cf. Great Britain 1,008,170 and Novak and Weichet, Experientia XXI, 6 360, (1965)] or by the use of enzymes or of an N,N'-carbonyldiimidazole or an N,N'-carbonylditriazole [cf. South African patent specification 63/2,684] or a carbodiimide reagent [especially N,N'-dicyclohexylcarbodiimide, N,N' - diisopropylcarbodiimide or N-cyclohexyl-N' - (2 - morpholinoethyl)carbodiimide; cf. Sheehan and Hess, J. Amer. Chem. Soc., 77, 1067 (1955)], or of alkylylamine reagent [cf. R. Buijle and H. G. Viehe, Angew. Chem. International Edition 3, 582 (1964)], or of a ketenimine reagent [cf. C. L. Stevens and M. F. Mond, J. Amer. Chem. Soc., 80, (4065)] or of an isoxazolium salt reagent [cf. R. B. Woodwar, R. A. Olofson and H. Mayer, J. Amer. Chem. Soc., 83, 1010 (1961)]. Another equivalent of the acid chloride is a corresponding azolide, i.e., an amide of the corresponding acid whose amide nitrogen is a member of an quasi-aromatic five-membered ring containing at least two nitrogen atoms, i.e., imidazole, pyrazole, the triazoles, benzimidazole, benzotriazole and their substituted derivatives. As an example of the general method for the preparation of an azolide, N,N'-carbonyldiimidazole is reacted with a carboxylic acid in equimolar proportions at room temperature in tetrahydrofuran, chloroform, dimethylformamide or a similar inert solvent to form the carboxylic acid imidazolide in practically quantitative yield with liberation of carbon dioxide and one mole of imidazole. Dicarboxylic acids yield dimidazolide. The by-product, imidazole, precipitates and may be separated and the imidazolide isolated, but this is not essential. The methods for carrying out these reactions to produce a cephalosporin and the methods used to isolate the cephalosporin so produced are well known in the art.

In the treatment of bacterial infections in man, the compounds of this invention are administered orally or parenterally, in accordance with conventional procedures for antibiotic administration, in an amount of from about 5 to 200 mg./kg./day and preferably about 5 to 20 mg./kg./day in divided dosage, e.g., three to four times a day. They are administered in dosage units containing, for example, 125 or 250 or 500 mg. of active ingredient with suitable physiologically acceptable carriers or excipients. The dosage units are in the form of liquid preparations such as solutions or suspensions or as solids in tablets or capsules.

Exactly 200 g. of 7 - aminocephalosporanic acid (7–ACA) was suspended in 500 ml. of acetone and a solution of 240 g. of p-toluenesulfonic acid in 500 ml. of acetone was added in one charge. After stirring for five minutes, at room temperature, the mixture was filtered through diatomaceous earth ("Super Cel") and the bed washed with 150 ml. of acetone (the insoluble matter weighed about 30 g.). Then 80 ml. of water was added to the filtrate and, while stirring, the p-toluene-sulfonate salt crystallized out after scratching on the inside of the flask with a glass rod. The suspension was stirred in an ice-salt bath for thirty minutes and filtered cold. It was washed with 2× 200 ml. of cold acetone (0° C.) and air dried; yield 250 g. of salt. This p-toluene-sulfonate salt of 7–ACA was stirred in 2 liters of methanol and the insoluble matter filtered through "Super Cel." The filtrate was placed in a five-liter 3-neck flask and 2 liters of water were added. Then the pH was adjusted to 4 by the addition of concentrated ammonium hydroxide with cooling and the suspension stirred for one hour at 0° C. The product was collected by filtration and washed with 2× 100 ml. $H_2O$ (0° C.) and 3× 1 liter acetone (room temperature). After air drying, the yield of 7–ACA was 145 g.

Reference: Glaxo, British Pat. 1,104,938 (1968).

The following examples are given in illustration of, but not in limitation of, the present invention. All temperatures are in degrees centigrade. 7-aminocephalosporanic acid is abbreviated as 7–ACA and methyl isobutyl ketone as MIBK. "Skellysolve B" is a petroleum ether fraction of B.P. 60–68° C. consisting essentially of n-hexane.

DESCRIPTION OF THE PREFERRED EMBODIMENTS

EXAMPLE 1

Sodium D-α-[1-carbomethoxypropen-2-yl)-amino]-phenylacetate

Lit. ref. E. Dane, F. Oreis, P. Konrad, T. Dockner, Angew. Chem. Intern. Ed. Engl. 1, 658 (1962); E. Dane and T. Dockner Angew. Chem. 76, 342 (1964); Spencer, Flynn, Roeske, Sin and Chauvette, J. Med. Chem., 9, 746–50 (1966); U.S. Pat. 3,496,171 (Lilly).

To a well-stirred mixture of 40 g. (1 mole) of NaOH in 40 ml. of $H_2O$ and one liter of benzene was added 151.6 g. (1 mole) of D-(—)-phenylglycine. The mixture was held at about 55° C. for 30 minutes and then with vigorous stirring 116 g. (1 mole) of methyl acetoacetate was added and the mixture stirred and heated at reflux until no more water was collected in the Dean-Stark trap. Next one liter of acetone was added with the heat removed and then the slurry was cooled and stirred 30 minutes in an ice-salt bath. The product was collected by filtration, washed well with copious amounts of acetone and air dried. Yield was 191 g., dec. pt. 252° C., $[\alpha]_D^{22°\ C.}$ +207° (C=1%, $H_2O$).

2-mercapto-5-methyl-1,3,4-oxadiazole

Lit. ref. E. Hoggarth, J. Chem. Soc., 4811–17 (1952).

14.8 g. (0.4 mole) of acethydrazide, 45.6 g. (0.6 mole) carbon disulfide, and 33.6 g. (0.6 mole) KOH in 200 ml. 100% ethanol were combined and stirred for 2.5 hours at 38° C., then at room temperature for 18 hours. The product was filtered off and recrystallized from 100% ethanol with a small amount of $H_2O$. Yield 38 g. of 2-acetyldithiocarbazinate potassium salt.

38 g. (0.2 mole) of potassium 2-acetyldithiocarbazinate was added to 100 ml. of dry pyridine and refluxed for 18 hours. Then 300 ml. of $H_2O$ was added and the pH adjusted to 2 by addition of concentrated HCl. After cooling it was filtered and the filtrate extracted continuously with ethyl ether for seven hours. The ether was dried over sodium sulfate and removed under vacuum to give the product. Recrystallized from benzene-"Skellysolve B." Colorless plates, M.P. 78–79° C. Yield 17 g.

*Analysis.*—Calcd. for $C_3H_4N_2OS$ (percent): C, 31.02; H, 3.47; N, 24.12; S, 27.61. Found (percent): C, 31.05; H, 3.46; N, 24.27; S, 26.94.

7-amino-3-(5-methyl-1,3,4-oxadiazol-2-ylthiomethyl)-3-cephem-4-carboxylic acid

Twenty-four grams (0.09 mole) of 7–ACA was dissolved in 450 ml. of 0.1 M phosphate buffer, pH 6.4 followed by 15 g. (0.18 mole) of sodium bicarbonate. Then 9.5 g. (0.09 mole) of 2-mercapto-5-methyl-1,3,4-oxadiazole was added and, with moderate stirring, the solution was heated to 60°±0.5° C. At 60° C. the pH was checked and additional sodium bicarbonate was added to readjust the pH to 6.4. The solution was heated with stirring at 60°±0.5° C. for four hours. Then 18 g. of "Darko KB" was added and stirring was continued for 15 minutes. The solution was then filtered hot and a clear solution was obtained. The pH was adjusted to 4.5 by addition of 3 N HCl. After cooling at 0° C. in an ice bath for one hour the product was filtered off and washed with cold water. After air drying 5.1 g. was obtained, M.P. 240° C. (dec.).

*Analysis.*—Calcd. for $C_{11}H_{12}N_4O_4S_2$ (percent): C, 40.23; H, 3.70; N, 17.06. Found (percent): C, 39.60; H, 4.18; N, 15.85.

Corrected for 0.7% $H_2O$.

The IR and NMR were consistent for the desired product.

7-(D-α-amino-α-phenylacetamido) - 3 - (5 - methyl-1,3,4-oxadiazol-2-ylthiomethyl)-3-cephem-4-carboxylic acid To a stirred suspension of 6.25 g. (0.023 mole) of Sodium D-α-[1 - carbomethoxypropen - 2 - yl)-amino]-phenylacetate in 70 ml. of acetonitrile and 2 drops of N, N-dimethylbenzylamine at —10° C. was added 3 g. (0.027 mole) of ethyl chloroformate and stirring continued for 15 minutes at —10° C. Next, a solution of 7.54 g. (0.023 mole) of 7-amino-3-(5-methyl - 1,3,4 - oxadiazol-2-ylthiomethyl)-3-cephem-4-carboxylic acid in 30 ml. of acetonitrile, 30 ml. $H_2O$ and 3.4 ml. (0.024 mole) of triethylamine was precooled to 0° C. and added all at once and stirring continued for 30 minutes at 0° C. Salt (NaCl) was added in excess to saturate the solution (15 minutes) and the organic layer was separated and to it added 25 ml. of $H_2O$. The resulting solution was concentrated in vacuo at 22° C. to a volume of about 35 ml. To this aqueous solution was added a solution of 9 ml. of 90% formic acid in 75 ml. of MIBK (methyl isobutyl ketone) and the mixture was stirred for 30 minutes. Four grams of solids were filtered off and air dried. This material was slurried in 35 ml. of $H_2O$ and 5 ml. of 40% $H_3PO_4$ for 15 minutes, filtered and the filtrate stirred another 15 minutes with 2 g. of "Darko KB" carbon, filtered again and finally the pH adjusted to 3.2 with $NaHCO_3$. A small amount of crystalline material was filtered off and discarded. The filtrate was concentrated slightly at reduced pressure (22° C.) and a gummy solid precipitated. The mixture was heated to 50° C. whereupon the material (solids) crystallized rapidly. After slowly cooling to room temperature there was obtained 1.24 g. of crystalline, white material, dec. pt. 165° C.

7-[D-(α-amino-α-phenylacetamido)] - 3 - (5-methyl-1,3,4 - oxadiazol-2-ylthiomethyl) - 3 - cephem-4-carboxylic acid (called New Compound) after solution in 5% $NaHCO_3$ followed by dilution with Nutrient Broth was found to exhibit the following Minimum Inhibitory Concentrations (M.I.C.) in mcg./ml. versus the indicated microorganisms as determined by overnight incubation at 37° C. by Tube Dilution. Results with four old compounds are also given.

TABLE 1

[M.I.C. in mcg./ml.]

| Organism | | New cpd. | Cepha-lexin | Cephalo-glycin | Cephalo-lothin | Cephalo-ridine |
|---|---|---|---|---|---|---|
| D. pneumoniae+5% serum* | A9585 | 0.13 | 1.3 | 0.3 | 0.08 | 0.008 |
| Str. pyogenes +5% serum* | A9604 | 0.25 | 0.3 | 0.16 | 0.08 | 0.008 |
| S. aureus Smith | A9537 | 1.3 | 1.3 | 1.3 | 0.08 | 0.03 |
| S. aureus Smith+50% serum | A9537 | >5 | 2.5 | 2.5 | 0.3 | 0.03 |
| S. aureus BX1633-2 at 10⁻³ dil'n | A9606 | 2.5 | 4 | 0.6 | 0.3 | 0.3 |
| S. aureus meth.-resistant | A15097 | 5 | 32 | 2 | 1.3 | 0.6 |
| Sal. enteritidis | A9531 | 0.6 | 4 | 0.3 | 0.3 | 0.6 |
| E. coli Juhl | A15119 | 4 | 8 | 1 | 4 | 1 |
| E. coli | A9675 | 8 | 16 | 4 | 16 | 1 |
| F. pneumoniae | A9977 | 1 | 4 | 0.6 | 1 | 1.3 |
| K. pneumoniae | A15130 | 8 | 8 | 1 | 8 | 2 |
| Pr. mirabilis | A9900 | 2 | 4 | 0.6 | 1 | 2.5 |
| Pr. morganii | A15153 | 16 | >125 | 16 | >250 | 250 |
| P. aeruginosa | A9843A | >250 | >125 | 250 | >250 | >250 |
| Ser. marcescens | A20019 | >250 | >125 | 250 | >250 | 250 |

*50% nutrient broth+45% antibiotic assay broth.

Blood levels in the mouse after oral administration were determined with the following results:

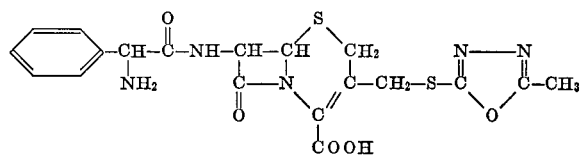

| R= | Dose, mgm./kg. | Hours after administration | | | |
|---|---|---|---|---|---|
| | | 0.5 | 5 | 2 | 3.5 |
| | | Blood level in mcg./ml. | | | |
| $-S-\overset{N=\!=\!=N}{\underset{\diagdown O \diagup}{C \quad C}}-CH_3$ | 20 | 5.3 | | | |
| $-H$ (cephalexin) | 20 | 8.79 | 3.51 | 0.58 | <0.16 |
| $-O-\overset{O}{\overset{\|}{C}}-CH_3$ (cephaloglycin) | 20 | 1.1 | 1.0 | 0.42 | 0.19 |

EXAMPLE 2

Sodium 7 - [D - (α-amino - α - phenylacetamido)]-3-(5-methyl-1,3,4-oxadiazol - 2 - ylthiomethyl) - 3 - cephem-4-carboxylate To a stirred aqueous suspension of the zwitterionic form of 7 - [D - (α - amino-α-phenylacetamido)]-3-(5-methyl-1,3,4-oxadiazol-2 - ylthiomethyl) - 3 - cephem-4-carboxylic acid (0.8 mmole) is added 1 N aqueous sodium hydroxide at room temperature until a clear solution (pH 10.8) is obtained. This solution is immediately freeze-dried to give impure, solid sodium 7 - [D - (α-amino-α-phenylacetamido)]-3-(5-methyl-1,3,4-oxadiazol - 2 - ylthiomethyl)-3-cephem-4-carboxylate.

I claim:

1. The compound having the D configuration in the sidechain of the formula

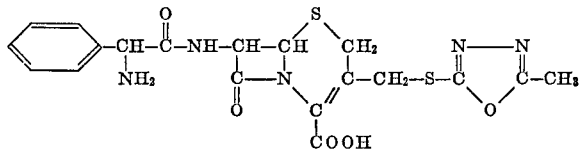

or a nontoxic, pharmaceutically acceptable salt thereof.

2. The compound having the D configuration in the sidechain of the formula

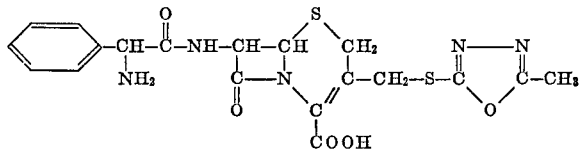

3. The sodium salt of the compound of claim 2.
4. The potassium salt of the compound of claim 2.
5. The hydrochloride of the compound of claim 2.
6. The zwitterion form of the compound of claim 2.
7. A nontoxic, pharmaceutically acceptable acid addition salt of the compound of claim 2.

References Cited

UNITED STATES PATENTS

| 3,641,021 | 2/1972 | Ryan | 260—243 C |
| 3,516,997 | 6/1970 | Takano et al. | 260—243 C |
| 3,243,435 | 3/1966 | Cowley et al. | 260—243 C |
| 3,365,449 | 1/1968 | Takano et al. | 260—243 C |
| 3,497,505 | 1/1970 | Pfeiffer et al. | 260—243 C |
| 3,530,123 | 9/1970 | Takano et al. | 260—243 C |

NICHOLAS S. RIZZO, Primary Examiner

U.S. Cl. X.R.

424—246